United States Patent
Pajukoski et al.

(10) Patent No.: US 9,374,184 B2
(45) Date of Patent: Jun. 21, 2016

(54) CONTROLLING OF CODE BLOCK TO PHYSICAL LAYER MAPPING

(75) Inventors: Kari Pekka Pajukoski, Oulu (FI); Esa Tapani Tiirola, Kempele (FI); Olav Tirkkonen, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 424 days.

(21) Appl. No.: 13/428,345

(22) Filed: Mar. 23, 2012

(65) Prior Publication Data

US 2013/0252624 A1 Sep. 26, 2013

(51) Int. Cl.

| H04J 13/00 | (2011.01) |
| H04W 4/00 | (2009.01) |
| H04B 14/04 | (2006.01) |
| H04L 1/00 | (2006.01) |
| H04W 72/00 | (2009.01) |
| H04B 1/50 | (2006.01) |
| H04B 15/00 | (2006.01) |
| H04J 11/00 | (2006.01) |
| H04L 1/20 | (2006.01) |

(52) U.S. Cl.
CPC .............. *H04J 11/004* (2013.01); *H04L 1/20* (2013.01); *H04L 1/0003* (2013.01); *H04L 1/0009* (2013.01)

(58) Field of Classification Search
CPC .............................. H04W 72/04; H04B 15/00
USPC .......... 714/728, 752, 758; 370/328, 210, 329, 370/479; 375/246, 267, 295, 316, 253, 346; 455/452.1
See application file for complete search history.

(56) References Cited

U.S. PATENT DOCUMENTS

| 2005/0281349 A1* | 12/2005 | Kim .......................... 375/267 |
| 2007/0189304 A1 | 8/2007 | Rosa |
| 2008/0184084 A1* | 7/2008 | Matsumoto .................. 714/728 |
| 2008/0240030 A1* | 10/2008 | Kolding et al. ............... 370/329 |
| 2008/0307427 A1* | 12/2008 | Pi et al. ........................ 718/104 |
| 2009/0052357 A1* | 2/2009 | Suo et al. ...................... 370/280 |
| 2009/0199066 A1* | 8/2009 | Kim et al. ..................... 714/752 |
| 2009/0219870 A1* | 9/2009 | Wengerter et al. ............ 370/329 |
| 2009/0307562 A1* | 12/2009 | Lee et al. ...................... 714/758 |
| 2010/0098006 A1* | 4/2010 | Golitschek Edler Von Elbwart et al. ............................. 370/329 |
| 2010/0202386 A1* | 8/2010 | Takaoka et al. ............... 370/329 |
| 2010/0296385 A1* | 11/2010 | Li ................................. 370/210 |
| 2010/0303016 A1* | 12/2010 | Jin et al. ....................... 370/328 |
| 2011/0002365 A1* | 1/2011 | Khayrallah et al. .......... 375/148 |
| 2011/0033001 A1* | 2/2011 | Roh et al. ..................... 375/260 |
| 2011/0206170 A1* | 8/2011 | Wilborn et al. ............... 375/346 |
| 2011/0280133 A1* | 11/2011 | Chang et al. ................. 370/241 |
| 2011/0287790 A1* | 11/2011 | Haustein et al. .............. 455/500 |
| 2012/0008524 A1* | 1/2012 | Amirijoo et al. ............. 370/252 |

OTHER PUBLICATIONS

International Search Report application No. PCT/EP2013/055080 dated Jun. 18, 2013.

* cited by examiner

*Primary Examiner* — Alpus H Hsu
*Assistant Examiner* — Camquyen Thai
(74) *Attorney, Agent, or Firm* — Squire Patton Boggs (US) LLP (57) ABSTRACT

A method, apparatus, and computer program for interference cancellation in communication systems is provided. The method includes controlling of code block to physical layer mapping. The controlling includes mapping code blocks to the physical layer such that interfering signals become self-decodable at a receiving bandwidth of the user equipment.

17 Claims, 6 Drawing Sheets

CONTROLLING OF CODE BLOCK TO PHYSICAL LAYER MAPPING

FIELD

Embodiments of the invention relate to wireless communications systems and, more specifically, to interference cancellation in wireless communications systems, such as the Universal Mobile Telecommunications System (UMTS) Terrestrial Radio Access Network (UTRAN) Long Term Evolution (LTE) and Evolved UTRAN (E-UTRAN).

BACKGROUND

Universal Mobile Telecommunications System (UMTS) Terrestrial Radio Access Network (UTRAN) refers to a communications network including base stations, or Node Bs or enhanced Node Bs (eNBs), and radio network controllers (RNC). UTRAN allows for connectivity between the user equipment (UE) and the core network. The RNC provides control functionalities for one or more Node Bs serving the UEs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is can also improve spectral efficiency in networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

It should be noted that, in order to achieve high bandwidth or spectral efficiency in wireless communications systems, interference associated with transmissions between nodes (e.g., UEs) in the system needs to be controlled and reduced.

SUMMARY

One embodiment is directed to a method for cancelling interference at a user equipment. The method includes controlling of code block to physical layer mapping. Code blocks are mapped to the physical layer such that interfering signals become self-decodable at a receiving bandwidth of the user equipment.

Another embodiment is directed to an apparatus configured to cancel interference. The apparatus includes at least one processor, and at least one memory including computer program code. The at least one memory and the computer program code are configured, with the at least one processor, to cause the apparatus at least to control code block to physical layer mapping. Code blocks are mapped to the physical layer such that interfering signals become self-decodable at a receiving bandwidth of the user equipment.

Another embodiment is directed to a computer program, embodied on a non-transitory computer readable medium, the computer program configured to control a processor to perform a process. The process includes controlling of code block to physical layer mapping. Code blocks are mapped to the physical layer such that interfering signals become self-decodable at a receiving bandwidth of the user equipment.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of a system, a method, an apparatus, and a computer program product for cancelling interference, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention generally relate to a method, apparatus and computer program for interference cancellation in communication systems including orthogonal frequency division multiple access (OFDMA) systems, such as LTE and WiMAX.

Interference cancelling receivers for UE will be part of LTE-Advanced evolution (i.e., 3GPP Rel-12 and beyond). The interference cancelling receivers can be used to cancel cross-layer interference of multiple input multiple output (MIMO) transmission (single user-MIMO, multi-user-MIMO), non-orthogonal access within the cell or other-cell interference (receiver CoMP). Embodiments of the invention relate to interference cancellation between different UEs, or between transmissions to/from different cells.

Interference cancellation is a promising technique to improve throughput in a multi-cell system. By mitigating the interference from neighboring cells, the signal to interference and noise ratio (SINR) of the own signal improves and the throughput increases. The concept behind interference cancellation is that unwanted signal(s) from dominant interference is detected and subtracted from the wanted signal(s). In order to obtain the best performance, the error correction coding should be integrated into the detection process.

Turbo coding is used as error correcting code with shared data channel, such as the physical downlink shared channel (PDSCH), in 3GPP-based systems. The 3GPP LTE Turbo encoding specified in the 3GPP LTE specification (TS 36-series) uses parallel concatenated convolutional code. An information sequence is encoded by a recursive convolutional encoder, and an interleaved version of the information sequence is encoded by another recursive convolutional encoder.

In LTE a minimum and maximum code block size has been specified so that the code block sizes are compatible with the block sizes supported by the Turbo interleaver. In particular, the minimum code block size=40 bits; and the maximum code block size=6144 bits.

Figure 1:
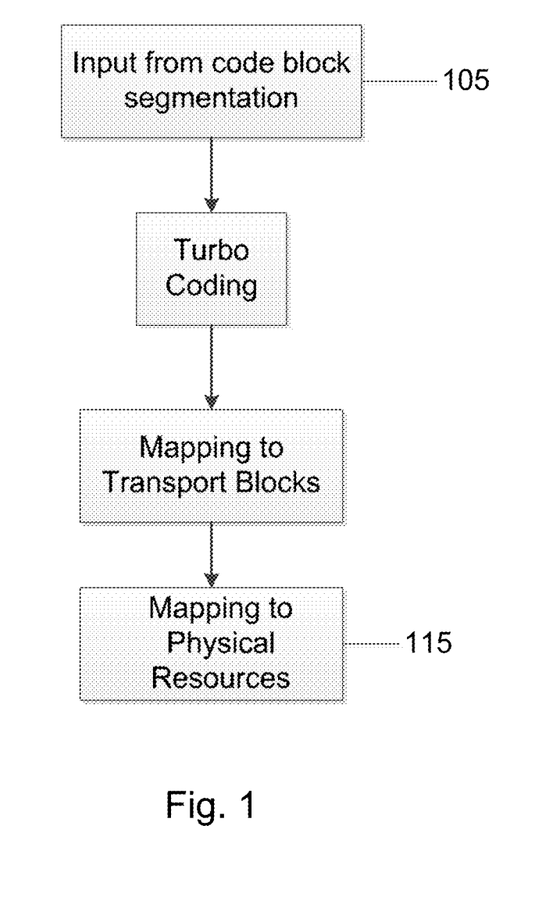
FIG. 1 illustrates an example of the turbo coding process, according to an embodiment.

FIG. 1 illustrates an example of the turbo coding process. As illustrated in FIG. 1, if the length of the input code block is greater than the maximum code block size, the input block is segmented at 105. For example, one TCP/IP packet (1500 bytes=12000 bits) would be segmented into two segments. Each transport block may contain one or multiple code blocks depending on the MIMO scheme. The transport blocks are mapped into physical layer symbols at 115. The mapping principle is that one coding block is mapped into a distinct set of modulation symbols in order to enable delay efficient pipeline processing at the receiver site. The physical layer resource is made up of subsets of sub-carriers. In LTE, the minimum size of sub-carrier subset is 12 sub-carries.

As mentioned above, the basic concept of interference cancellation is that the unwanted signal is detected first and then subtracted from the wanted signal. In the subtraction and detection process, utilization of the error correcting decoding is the key issue (the so called uncoded IC, i.e., interference cancelling receiver based on symbol level estimates only does not perform well enough). However, the detection of signals from interfering transmissions utilizing output of a turbo decoder results in excessive complexity, especially in the case when the interfering and wanted transmissions are allocated on partially non-overlapping resources in the frequency domain. This is because the UE needs to detect all interfering signals from that partial overlap in frequency with the own signal in order to get a reliable estimate of the interfering signals.

Figure 2:
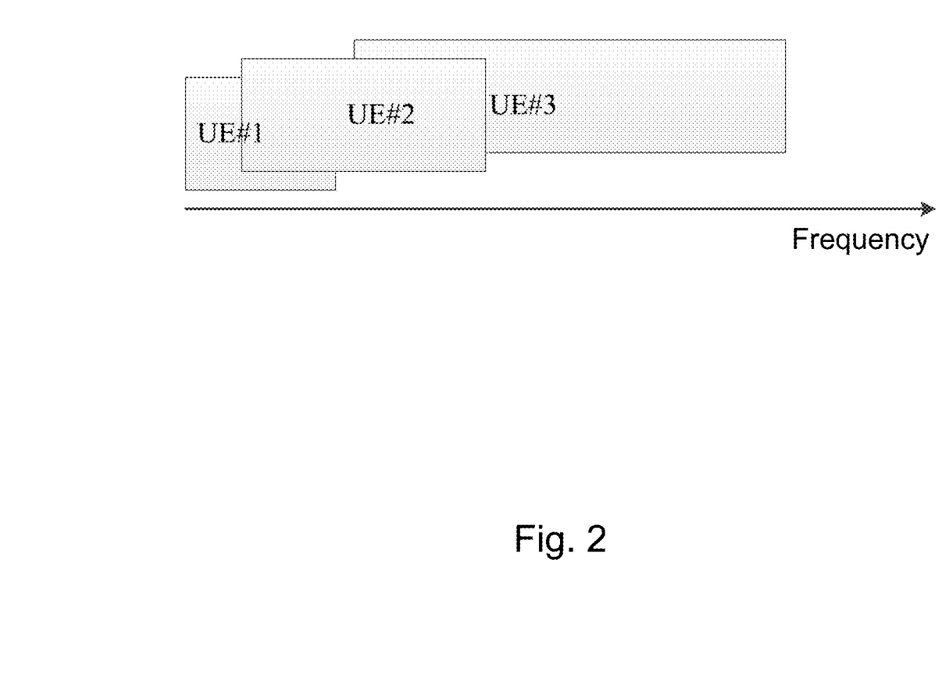
FIG. 2 illustrates an example of partially overlapping resource allocation in frequency.

FIG. 2 illustrates an example of partially overlapping resource allocation in frequency. Signals of different UEs can originate from different cells. For example, as shown in FIG. 2, if UE#1 tries to cancel interference from UE#2, it should first detect UE#2. In order to get reliable estimate of bits transmitted to UE#2, UE#1 needs to detect UE#2 signal with larger bandwidth than the own signal. Furthermore, before UE#1 can get reliable estimate from UE#2 signal, it needs to detect UE#3 signals and subtract it from UE#2 signal. As a summary, the DL interference cancelling can be a challenging task from UE complexity point of view. Therefore, reasonable complexity can be attained only with equal bandwidth and fully overlapping resource allocation among the UEs. This introduces scheduling restrictions, tight coordination requirement between adjacent cells and potential performance reduction.

In view of the above, embodiments of the invention are directed to an interference cancelling optimized code block to physical layer mapping. One embodiment includes a method and apparatus that provides improved support for downlink interference cancelling receivers utilizing turbo decoding in the detection process. According to an embodiment, code blocks are aligned with physical layer resource allocation which enables a low complexity detection process even if the interfering UEs are allocated in partially non-overlapping frequency resources.

Figure 3:
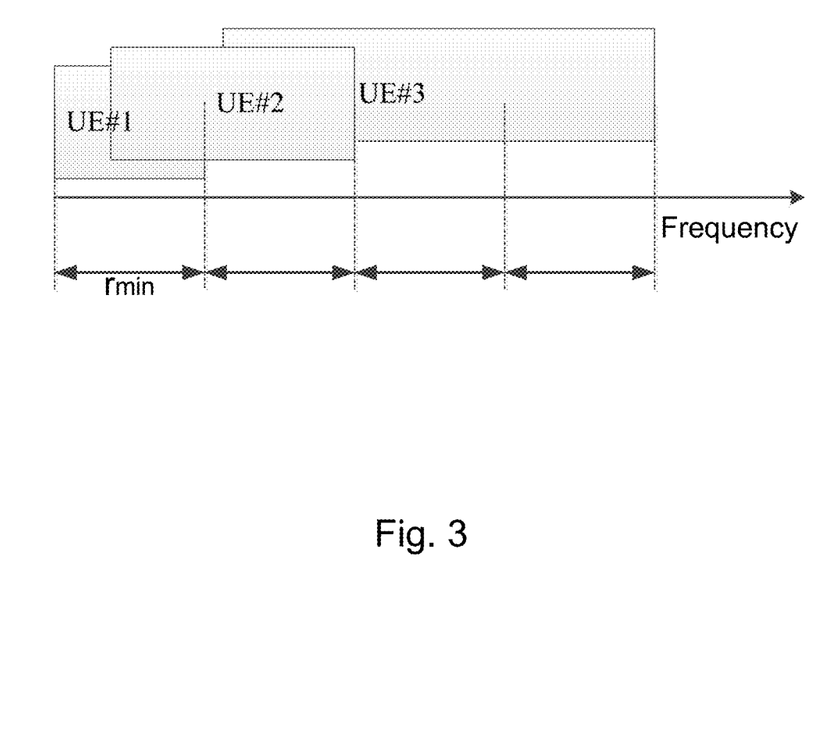
FIG. 3 illustrates an example of the maximum code block size being limited to a minimum allocation resolution of the physical layer, according to one embodiment.

As illustrated in FIG. 3, one embodiment includes the maximum code block size being limited to a minimum allocation resolution of the physical layer. In FIG. 3, the minimum resource allocation resolution corresponding to the maximum code block size is denoted by rmin. For the signaling coordination, the eNBs will need to exchange information of rmin. This can be done via the backhaul, such as X2 interface, via over-the-air communication channel (direct eNB-eNB), or even relaying via the UE. The information exchange due to coordination should be small and rather static.

In one embodiment, the maximum code block length depends on the minimum resource allocation resolution (rmin) and varies according to the modulation and coding scheme used. Thus, according to an embodiment, the maximum code block length may be calculated according to the following: the number of modulation symbols for data (per TTI) multiplied by the coding rate multiplied by modulation (bits/modulation symbol). For example, considering LTE, if the minimum allocation resolution is 10 physical resource blocks (PRBs), then the maximum code block length is the following: quadrature phase shift keying (QPSK) with ½ coding is approximately 1440 bits; and 16QAM (quadrature amplitude modulation) with ⅔ coding is approximately 3840 bits. According to certain embodiments, if the length of the input code block is greater than the maximum code block length, the input block is segmented, i.e., divided into multiple blocks.

Another aspect of the invention is that the code block sizes can be dynamically changed and controlled by the eNB. The basic rule is that code blocks are mapped to the physical layer such that interfering signals become self-decodable at the receiving bandwidth of the desired UE. It is noted that this rule does not necessarily require any additional signaling related to code block size because (1) the desired UE may become aware of the transmission parameters of interfering UEs by reading the control channels of the interfering UEs, and (2) interfering UEs follow the same "code block to physical layer mapping" rule. This takes care that the overlapping part of interfering signals are made up of self-decodable coding block(s) only. For example, according to FIG. 3, if UE#3 is desired UE and it tries to cancel interference from UE#2, then according to an embodiment, the overlapping part of UE#2 is self-decodable. This can be achieved, for example, when the data bits of UE#2 are segmented into two parts. Both segments are mapped separately into the physical layer resources corresponding to rmin. Interleaving is also performed within the segment. This arrangement would enable UE#3 to attempt to decode the UE#2 signal in the overlapping part only.

According to one embodiment, allocation of the UEs in frequency is aligned according to rmin. This takes care that the number of interfering UEs to be cancelled is minimized. The starting position of the "scheduling grid" may be part of signaling coordination among neighboring eNBs.

Figure 4:
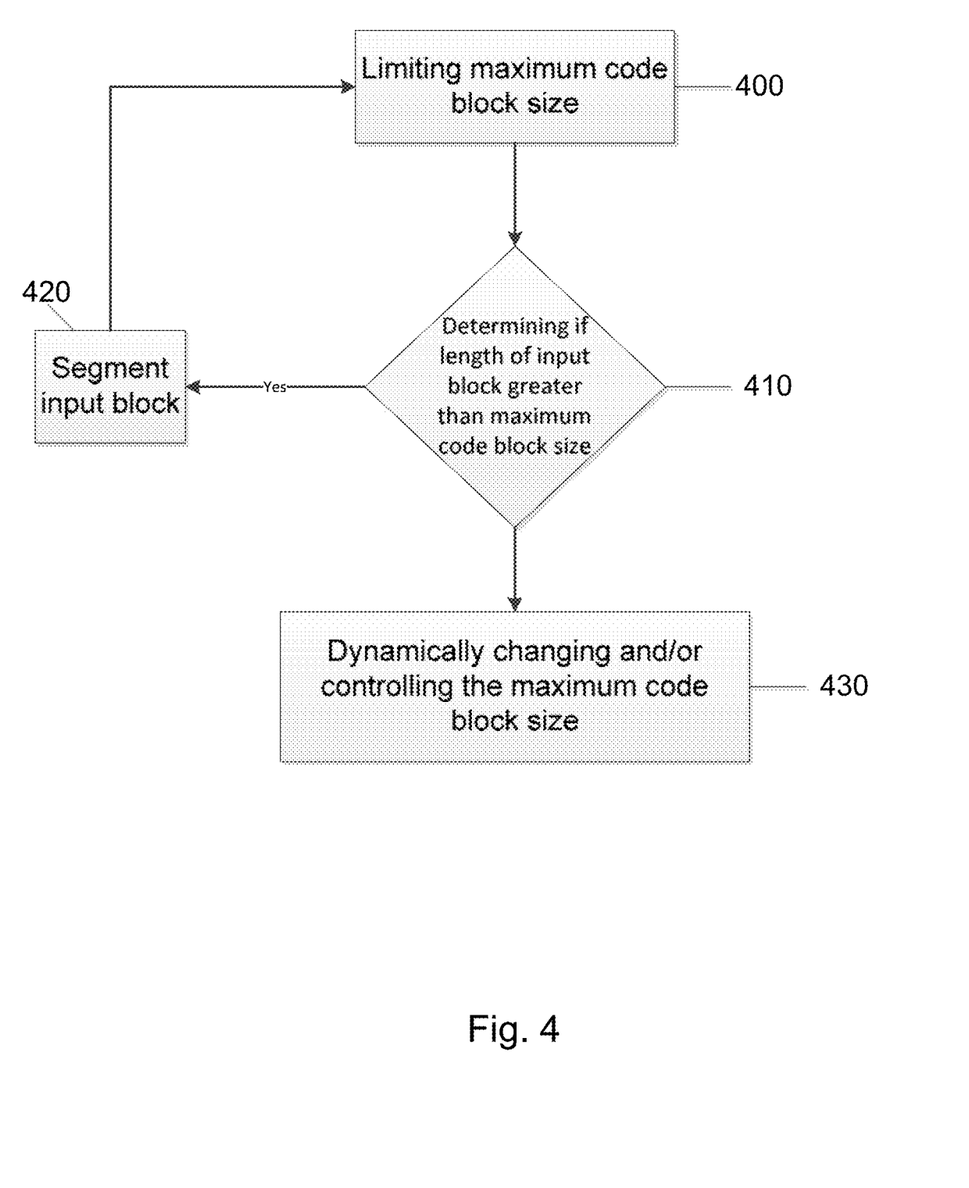
FIG. 4 illustrates a flow diagram of a method according to one embodiment.

FIG. 4 illustrates a flow diagram of a method according to an embodiment of the invention. The method of FIG. 4 includes interference cancelling optimized code block to physical layer mapping. More specifically, the method, at 400, align code blocks with physical layer resources by limiting a maximum code block size to a minimum allocation resolution of physical layer resources. In an embodiment, code blocks are mapped to the physical layer such that interfering signals become self-decodable at a receiving bandwidth of the UE. At 410, the method may include determining whether the length of the input code block is greater than the maximum code block size. If it is determined that the length of the input code block is greater than the maximum code block size, then the method includes segmenting the input code block into multiple blocks at 420. The method may optionally include, at 430, dynamically changing and/or controlling the code block sizes. It should be noted that not all embodiments include or require step 430 of dynamically changing and/or controlling the code block sizes.

In some embodiments, the functionality of any of the methods described herein, may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Figure 5:
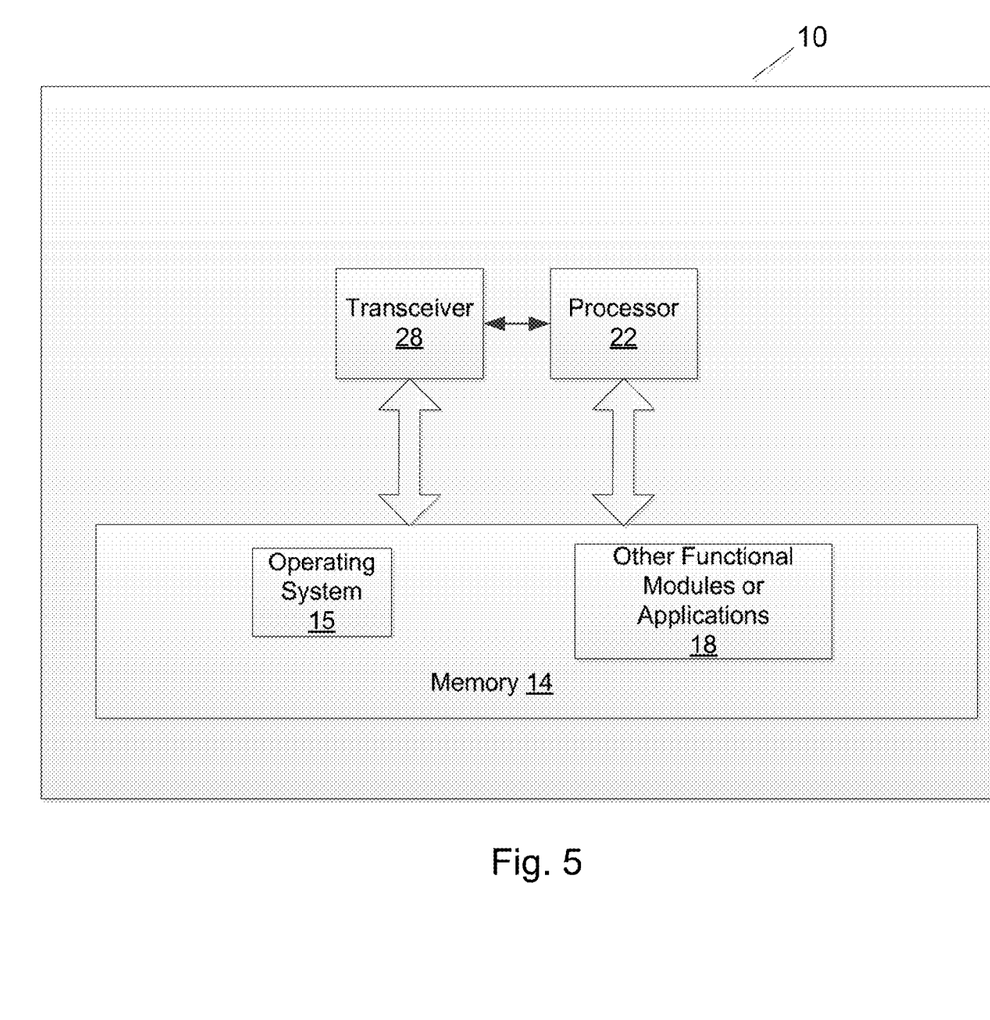
FIG. 5 illustrates an apparatus according to one embodiment.

FIG. 5 illustrates an apparatus 10 according to one embodiment. In an embodiment, apparatus 10 may be a UE or eNB configured to cancel interference at the UE. Apparatus 10 includes a processor 22 for processing information and executing instructions or operations. Processor 22 may be any type of general or specific purpose processor. While a single processor 22 is shown in FIG. 5, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to one embodiment, apparatus 10 may be configured to limit or cancel interference at a UE. More specifically, according to one embodiment, memory 14 and processor 22 are configured to cause apparatus 10 to limit a maximum code block size to a minimum allocation resolution of physical layer resources. In an embodiment, code blocks are mapped to the physical layer such that interfering signals become self-decodable at a receiving bandwidth of the UE. Memory 14 and processor 22 may be further configured to cause apparatus 10 to determine whether the length of the input code block is greater than the maximum code block size. If it is determined that the length of the input code block is greater than the maximum code block size, then apparatus 10 may be controlled to segment the input code block into multiple blocks. Memory 14 and processor 22 may also be configured to cause apparatus 10 to dynamically change and control the code block sizes.

Some embodiments of the invention can be applied to slightly coordinated networks, and may also be applicable to fully coordinated network, MU-MIMO and non-orthogonal multiple access networks. With MU-MIMO, embodiments allow pairing over non-equal bandwidth allocation with efficient interference cancelling based on turbo decoder. Thus, besides throughput gain, embodiments of the invention can remove an important scheduling constraint for MU-MIMO scheduling. This will ease scheduler implementation and increase scheduling flexibility which is valuable when considering scheduling based QoS provisioning.

Thus, some embodiments of the invention are applicable to improve performance of non-orthogonal multiple access. Non-orthogonal access is considered as a potential multiple access scheme to significantly increase the downlink capacity that can be offered to cell edge users. The principle, based on path loss separation of cell center users and cell edge users, includes allocating more resources to cell edge users (at the expense of cell center UEs). In an extreme case, all resources are given to the weakest user. In that case, QPSK is transmitted to that user (with power Sw), and the stronger users get superposed QPSK/QAM (with power Ss). Ss is seen as additional interference to the weak user. The weak user's conditions does not suffer much if Ss/Sw<SINRw (note also that cell edge users benefit from additional resources). For stronger user, weaker user's signal should be cancelled. The cancellation may be based on the embodiment discussed above where the code block sizes can be dynamically changed and controlled.

Figure 6:
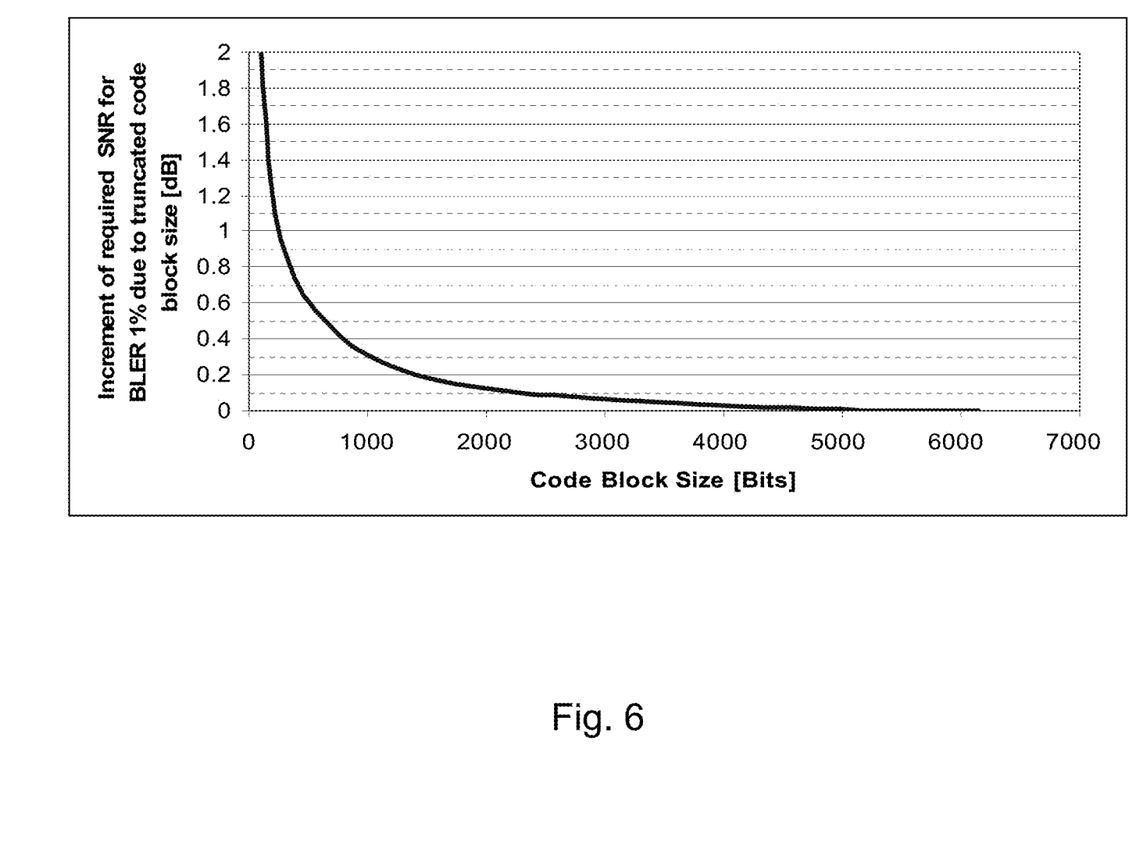
FIG. 6 illustrates a graph showing the performance of Turbo coding as function of code block size.

FIG. 6 illustrates the performance of Turbo coding as function of code block size. As illustrated in FIG. 6, embodiments may lead to reduced Turbo coding gain from in some cases. However, the coding gain reduction is smaller than obtained benefit from interference cancelling utilizing soft output of Turbo coding.

In view of the above, embodiments of the invention are configured to limit the maximum code block size to a minimum allocation resolution of physical layer resources (i.e., PRB). According to one aspect, the eNB may be configured to dynamically control the maximum code block size. The code block assignment to physical resources is arranged in a way that allows an easy implementation of IC receiver, and such that overlapping code blocks of different UEs are self-decodable even though resource allocation may differ. In this way, it is possible for the UE to cancel interference from an interfering signal without necessarily decoding the entire interfering signal (the interfering signal is basically "decomposed" in a set of self-decodable signals, and the UE only needs to detect the signals that are overlapping with its desired allocation). In an embodiment, the interference cancellation at the receiver side is based on segmented turbo coding at transmitter side.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
controlling of code block to physical layer mapping by limiting a maximum code block size to a minimum allocation resolution in physical resource blocks of the physical layer, wherein the minimum allocation resolution is minimum among a desired link and at least one interfering communication link applying at least partially overlapping bandwidth with the desired link;
wherein code blocks are mapped to the physical layer such that an overlapping part of interfering signals become self-decodable at a receiving bandwidth of a user equipment, and
wherein the interfering signals become self-decodable by segmenting them into a plurality of parts, and separately mapping the parts into the physical layer resource blocks corresponding to the minimum allocation resolution.

2. The method according to claim 1, further comprising dynamically changing and controlling sizes of the code blocks.

3. The method according to claim 1, wherein, when a length of an input code block is greater than the maximum code block size, the method further comprises segmenting the input code block into multiple blocks.

4. The method according to claim 1, wherein the maximum code block size depends on the minimum allocation resolution and varies according to a modulation and coding scheme that is used.

5. The method according to claim 4, wherein the maximum code block size is equal to:
a number of modulation symbols for data x coding rate x modulation.

6. The method according to claim 1, wherein allocation of a plurality of user equipment in frequency is aligned according to the minimum allocation resolution corresponding to the maximum code block size.

7. The method according to claim 1, further comprising exchanging information of the minimum resource allocation corresponding to the maximum code block size, wherein the exchanging comprises exchanging the information via X2 interface, via an over-the-air communication channel, or relaying via the user equipment.

8. An apparatus, comprising:
at least one processor; and
at least one memory including computer program code;
the at least one memory and the computer program code are configured, with the at least one processor, to cause the apparatus at least to control code block to physical layer mapping by limiting a maximum code block size to a minimum allocation resolution in physical resource blocks of the physical layer, wherein the minimum allocation resolution is minimum among a desired link and at least one interfering communication link applying at least partially overlapping bandwidth with the desired link,
wherein code blocks are mapped to the physical layer such that an overlapping part of interfering signals become self-decodable at a receiving bandwidth of a user equipment, and
wherein the interfering signals become self-decodable by segmenting them into a plurality of parts, and separately mapping the parts into the physical layer resource blocks corresponding to the minimum allocation resolution.

9. The apparatus according to claim 8, wherein the at least one memory and the computer program code are further configured, with the at least one processor, to cause the apparatus at least to dynamically change and control sizes of the code blocks.

10. The apparatus according to claim 8, wherein, when a length of an input code block is greater than the maximum code block size, the at least one memory and the computer program code are configured, with the at least one processor, to cause the apparatus at least to segment the input code block into multiple blocks.

11. The apparatus according to claim 8, wherein the maximum code block size depends on the minimum allocation resolution and varies according to a modulation and coding scheme that is used.

12. The apparatus according to claim 11, wherein the maximum code block size is equal to:
a number of modulation symbols for data x coding rate x modulation.

13. The apparatus according to claim 8, wherein allocation of a plurality of user equipment in frequency is aligned according to the minimum allocation resolution corresponding to the maximum code block size.

14. The apparatus according to claim 8, wherein the at least one memory and the computer program code are further configured, with the at least one processor, to cause the apparatus at least to exchange information of the minimum resource allocation corresponding to the maximum code block size with at least one eNB,
wherein the exchanging comprises exchanging the information via X2 interface, via an over-the-air communication channel, or relaying via the user equipment.

15. A computer program, embodied on a non-transitory computer readable medium, the computer program configured to control a processor to perfom1a process, comprising:
controlling of code block to physical layer mapping by limiting a maximum code block size to a minimum allocation resolution in physical resource blocks of the physical layer, wherein the minimum allocation resolution is minimum among a desired link and at least one interfering communication link applying at least partially overlapping bandwidth with the desired link;
wherein code blocks are mapped to the physical layer such that an overlapping part of interfering signals become self-decodable at a receiving bandwidth of a user equipment, and
wherein the interfering signals become self-decodable by segmenting them into a plurality of parts, and separately mapping the parts into the physical layer resource blocks corresponding to the minimum allocation resolution.

16. The computer program according to claim 15, the process further comprising dynamically changing and controlling sizes of the code blocks.

17. The computer program according to claim 15, wherein, when a length of an input code block is greater than the maximum code block size, the process further comprises segmenting the input code block into multiple blocks.

* * * * *